July 11, 1967    E. F. HOOKER    3,329,975
FOLDABLE AND ADJUSTABLE WIDTH BED FRAME
Filed June 30, 1964    4 Sheets-Sheet 1
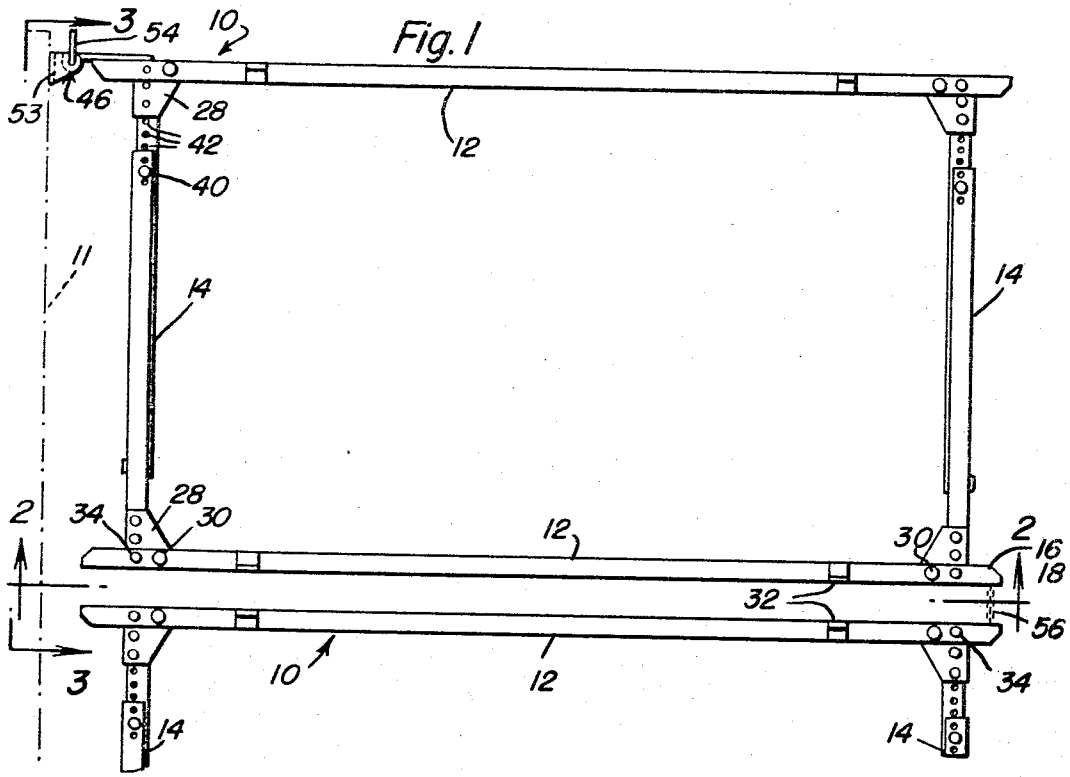
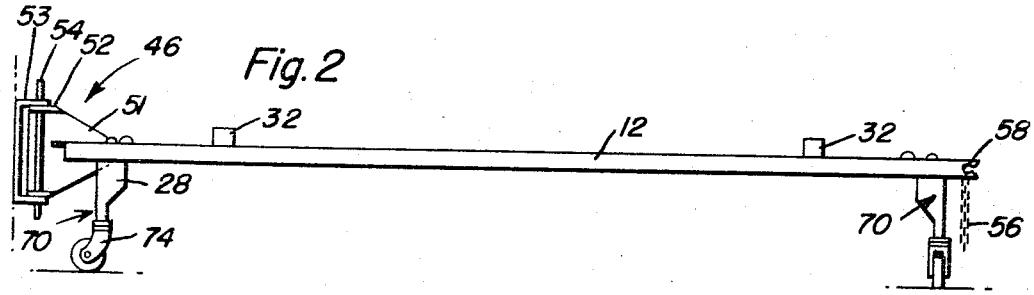
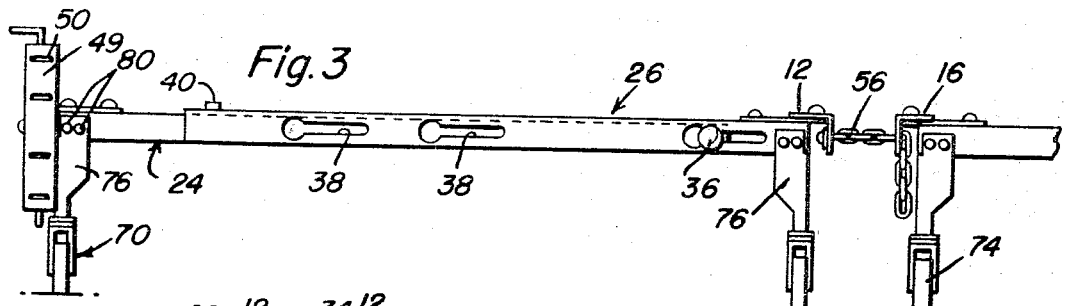
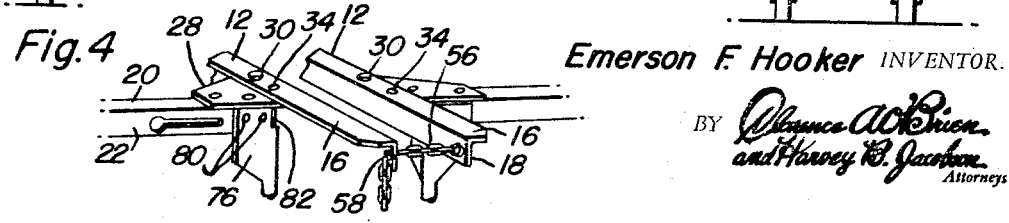
Emerson F. Hooker INVENTOR.

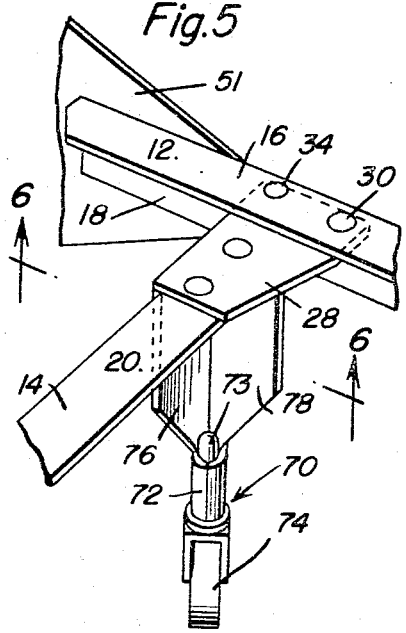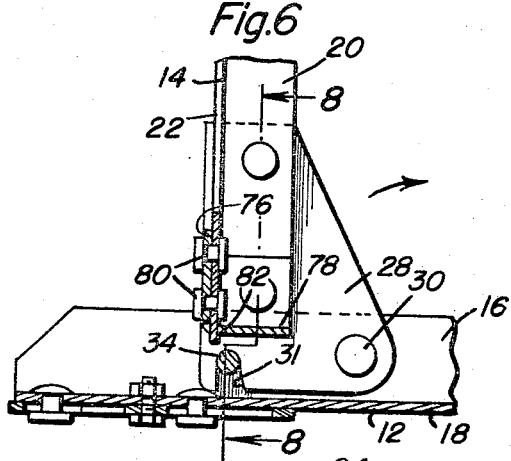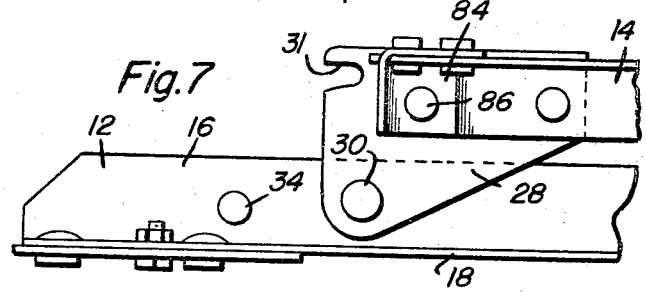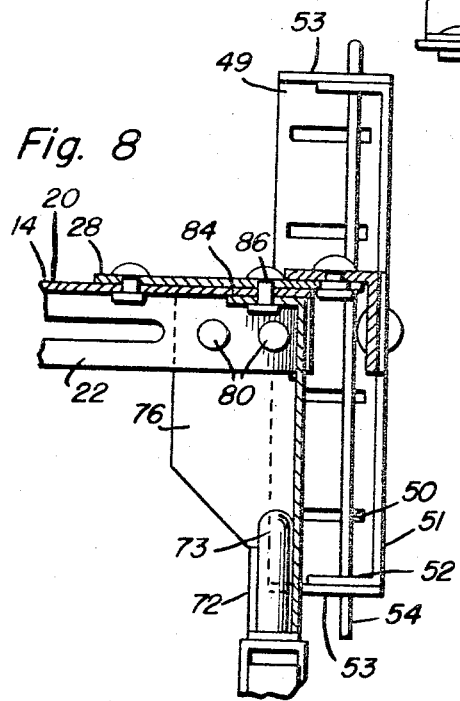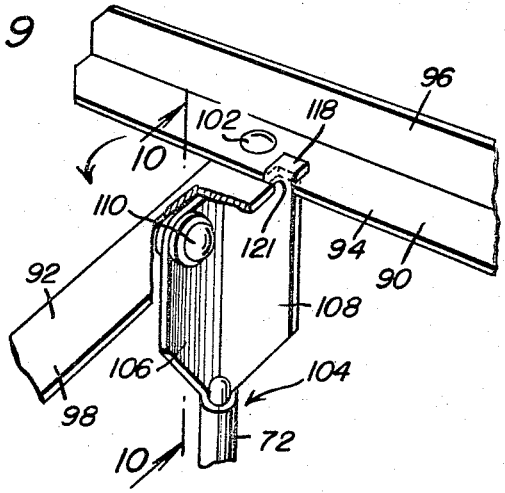

July 11, 1967 E. F. HOOKER 3,329,975
FOLDABLE AND ADJUSTABLE WIDTH BED FRAME
Filed June 30, 1964 4 Sheets-Sheet 3

Emerson F. Hooker
INVENTOR.

BY Clarence A O'Brien
and Harvey B. Jacobson
Attorneys

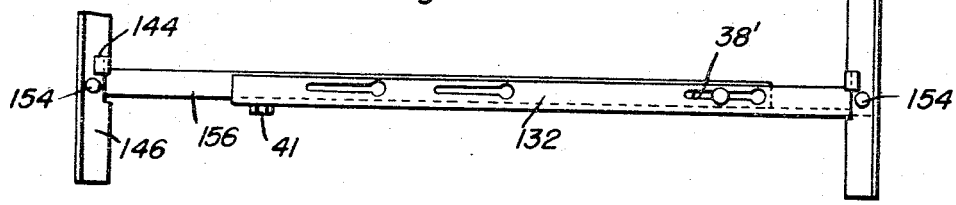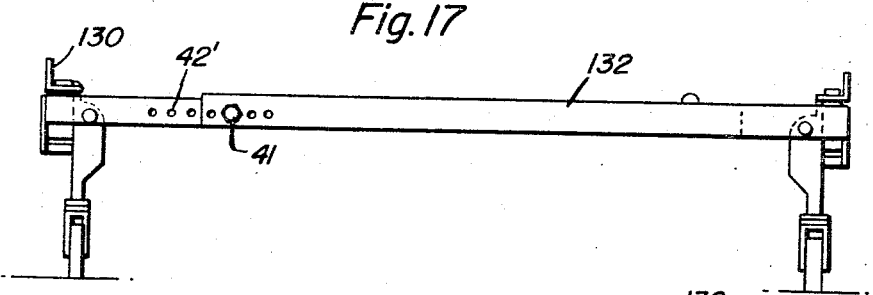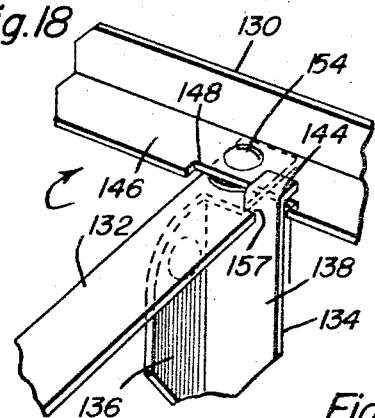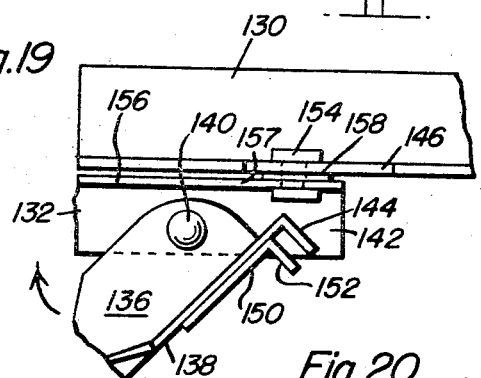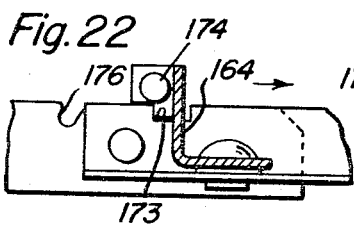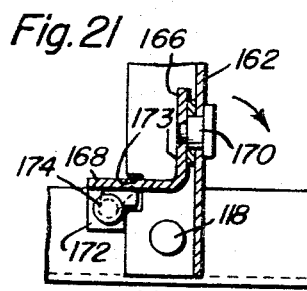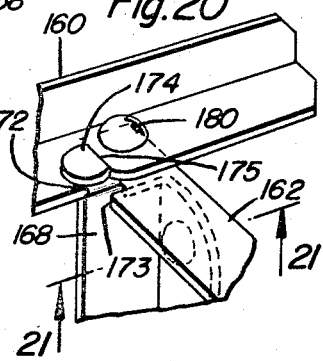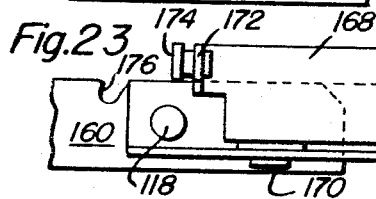

United States Patent Office 3,329,975
Patented July 11, 1967

3,329,975
FOLDABLE AND ADJUSTABLE WIDTH BED FRAME
Emerson F. Hooker, c/o Metal Bed Rail Company, Inc., P.O. Box 866, Lexington, N.C. 27292
Filed June 30, 1964, Ser. No. 379,261
2 Claims. (Cl. 5—8)

This invention comprises a novel and useful foldable and adjustable width bed frame and more particularly pertains to a bed frame construction having novel and advantageous constructions of cross or end rails with means for adjusting the length of and thereby varying the width of the bed together with pivoted and interlocking support legs for the bed frame.

It is the primary purpose of this invention to improve the construction of and facilitate the assembling and disassembling of metal bed frames by providing pivotal connections and rendering foldable into a compact volume the side and end rail elements of the bed frame together with a foldable leg construction having interlocking engagement with the rails.

A further object of the invention is to provide a metal bed frame having an end or cross rail construction which shall be readily adjustable in order to thereby vary the width of the bed and thus enable bed frames of different sizes to be erected from the same standard bed frame components.

Still another purpose of the invention is to provide a bed frame construction in accordance with the foregoing objects having a foldable and locking leg construction which will rigidify the side and end or cross-rail members and strengthen the latter at their pivoted joints.

Still another purpose of the invention is to provide a foldable and adjustable width bed frame wherein the foldable legs and their locking means shall be mounted in a concealed manner upon the frame and wherein the width adjusting means of the end or cross rails shall be of an extremely simple and sturdy construction.

Yet another purpose of the invention is to provide a foldable and adjustable width bed frame which shall dispense with the requirement for tools to erect or disassemble the frame.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURES 1–8 disclose a preferred embodiment of a bed frame construction in accordance with this invention in which:

FIGURE 1 is a fragmentary top plan view of a Hollywood bed frame in accordance with this invention, one of the two bed units being broken away;

FIGURE 2 is a side elevational view of the bed frame of FIGURE 1, being taken in vertical longitudinal section substantially upon the plane indicated by section line 2—2 of FIGURE 1;

FIGURE 3 is a view partly in elevation and partly in vertical section of the adjustable end rail of the bed frame of FIGURE 1, being taken substantially upon the plane indicated by broken section line 3—3 of FIGURE 1;

FIGURE 4 is a perspective view of the chain adjusting means for releasably retaining the non-hinged ends of the two bed units of FIGURE 1;

FIGURE 5 is a detailed view in perspective of the support leg construction and locking means;

FIGURE 6 is a view in transverse section of the corner and foldable leg construction, taken substantially upon a plane indicated by section line 6—6 of FIGURE 5;

FIGURE 7 is a fragmentary view in top plan of a corner construction of FIGURES 5 and 6 but with the the end rails being shown in folded position upon the bed side rail;

FIGURE 8 is a detailed view in vertical longitudinal section taken substantially upon the plane indicated by section line 8—8 of FIGURE 6;

Figure 10:
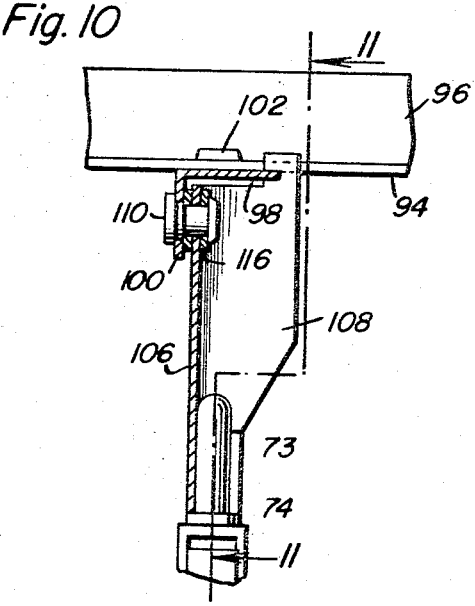
Figure 11:
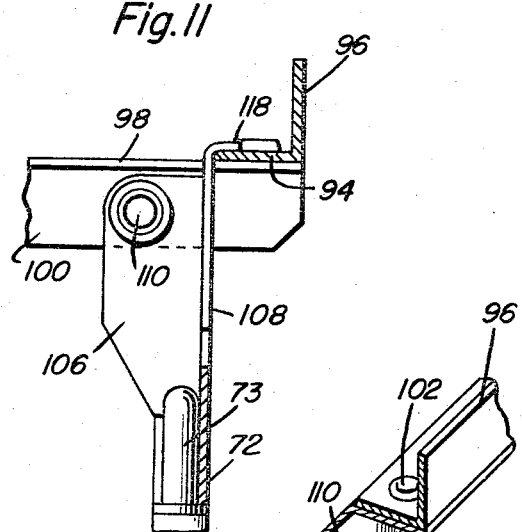
Figure 12:
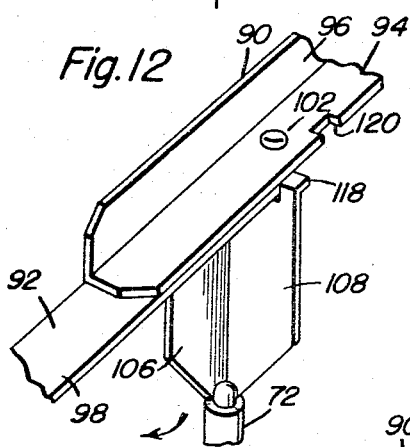
Figure 14:
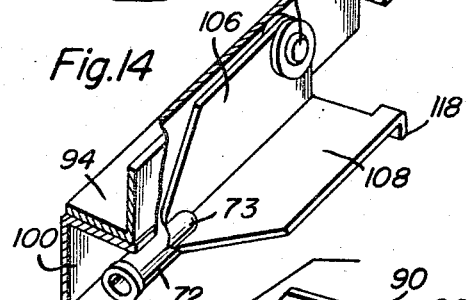
Figure 13:
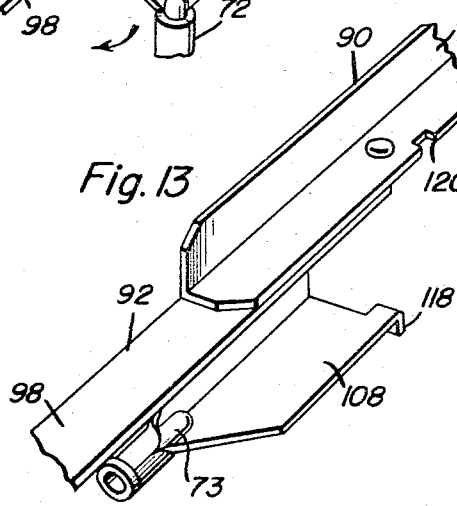
Figure 15:
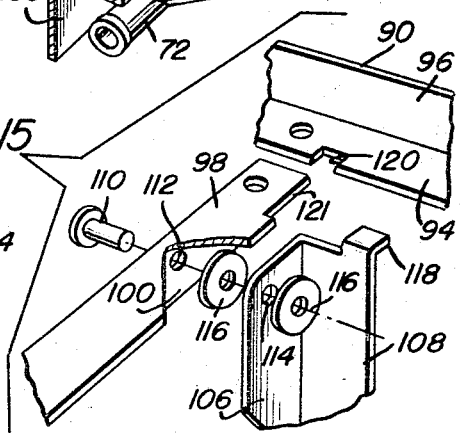

FIGURES 9–15 disclose a second form of the invention in which:

FIGURE 9 is a detailed view in perspective of a modified foldable end and side rail construction at the foot of the bed;

FIGURE 10 is a view in vertical section taken substantially upon a plane indicated by section line 10—10 of FIGURE 9;

FIGURE 11 is a detail view in vertical section taken substantially upon a plane indicated by broken section line 11—11 of FIGURE 10;

FIGURE 12 is a view similar to FIGURE 9 but illustrating the first step in the folding or storage of the bed frame, the direction of movement being indicated by an arrow therein;

FIGURE 13 is a view similar to and sequential to the diagrammatic view of FIGURE 9 and illustrating the second step in the folding operation and following the direction of movement indicated by the arrow in FIGURE 12;

FIGURE 14 is a view similar to FIGURE 13 but illustrating a third and final step of the folding operation following the direction indicated by the arrow in FIGURE 13 with parts being broken away and shown in section;

FIGURE 15 is an exploded perspective view of the structure of the frame components shown in FIGURES 9–14;

FIGURES 16–19 disclose a third embodiment of the invention in which:

FIGURE 16 is a view in top plan of the adjustable length end or cross rail utilized to effect a variation in width of the bed;

FIGURE 17 is a front elevational view of the structure shown in FIGURE 16;

FIGURE 18 is a detailed view in perspective of a modified foldable leg construction shown in FIGURES 16 and 17;

FIGURE 19 is a bottom plan view of the construction shown in FIGURE 18 but wherein the end rail has been turned in the direction of the arrow in FIGURE 18 and the pivoted leg structure is rotated in the direction indicated by the arrow in FIGURE 18;

FIGURES 20–23 disclose a fourth embodiment of the invention in which:

FIGURE 20 is a perspective detailed view of the foldable leg, side and end rail construction;

FIGURE 21 is a horizontal sectional view taken substantially upon a plane indicated by section line 21—21 of FIGURE 20;

FIGURE 22 is a view similar to FIGURE 21 but illustrating the first step of the folding operation wherein the end rail is moved in the direction of the arrow shown in FIGURE 21;

FIGURE 23 is a view similar to FIGURE 22 but illustrating the second and final step of the folding for storage operation wherein the leg structure is being rotated in the direction of the arrow in FIGURE 22.

Set forth in the accompanying drawings and the following specification are four modifications exemplary of the principles of this invention. Each of the modifications consists of a metal bed frame comprising a pair of side rails and a pair of cross or end rails with the latter being longitudinally adjustable in order to vary the width of the bed. Further, each cross rail is sectional, with one end of each being pivotally secured to a side rail adjacent the end of the latter and with the other ends of the associated cross rail sections being disposed in longitudinally adjustable overlapping relation. Still further, each cross rail section includes a supporting leg secured thereto adjacent the outer end of the section or adjacent its pivotal connection to the associated side rail. In certain forms of the invention disclosed herein the supporting leg is pivotally mounted upon the cross-rail section so that it is movable between a folded position against the cross rail with the latter in turn being foldable against the side rail, or to an extended position in which it supports the bed frame. The leg also includes a locking means engageable with the associated side rail to rigidly secure the leg in its supported position with the leg structure reinforcing and bracing the associated side and cross rail elements of the bed frame.

Referring first to FIGURE 1 there is disclosed a Hollywood bed type of construction in which a pair of bed frames each indicated by the numeral 10 are hingedly connected to a headboard 11 adjacent the outer corner thereof for horizontal swinging movement towards and from each other. The bed frames 10 are also individually usable as a single or double bed assembly. Each bed frame includes side rails 12 together with end or cross rails 14. As will be more readily apparent from FIGURES 3 and 4, each side rail and each cross rail are of angle construction having horizontal flanges 16 together with vertical depending flanges 18 for the side rails and 20 and 22 respectively for the cross rails.

The cross rails themselves are longitudinally adjustable, consisting of a pair of longitudinally slidably connected sections designated generally by the numerals 24 and 26. At the outer ends, each of the sections 24 and 26 has fixedly secured to the top surface thereof a hinge means by which it is connected to the associated side rail, in the form of a plate 28. The plate is secured to the top horizontal flange 20 of the cross rail sections in a fixed manner and is pivotally secured as at 30 to the underside of the horizontal flange 16 of the side rail.

It will be noted that the horizontal flanges 16 of the side rails have L-shaped clips 32 fixedly secured thereto flush with the outer surface of flanges 18 and which serve to retain box springs and the like upon the bed frame.

The hinge plate 28 as above mentioned is pivotally secured to the associated side rail 12 by a pivot pin or rivet 30 thereby enabling the cross rail to be swung horizontally from a perpendicular, laterally extending position shown in FIGURE 1 to a folded or closed position in side-by-side relation to and nested in the associated side rail. The side rail is further provided with a headed locking pin indicated at 34 which is received in a corresponding notch 31 in the end of the hinge plate 28 to thus provide a stop which limits the swinging movement of the cross rail away from the associated side rail and to prevent twisting of the plate 28.

In order to adjustably extend the cross rails 14, there is provided an adjusting means and a locking means. As illustrated the adjusting means consists of cooperating pins and slots in the vertical flanges of the inner ends of the cross rail sections, consisting of the headed fastener 36 carried by one of the cross rail sections such as the section 24, a series of elongated keyhole slots 38 disposed in longitudinally spaced relation in the vertical flange of the cross rail section 26. The fastener 36 is selectively engageable in any one of the slots 38 so that the cross rails may be disposed in various longitudinally adjusted position to thereby controllably vary the width of the bed.

In addition to the adjusting means, the cross rail sections also include locking means. These preferably include a depending locking member in the form of a pin 40 carried by and depending from the horizontal flange at the inner end of one of the cross rail sections such as the section 26, which cooperates with longitudinally spaced series of longitudinally spaced locking apertures 42 disposed in the horizontal flange 20 of the cross rail section 24. The arrangement is such that a series of longitudinally adjustable positions of the two cross rail sections relative to each other may be obtained by putting the locking pin 40 in a selected aperture 42 as the fastener 36 travels within its keyhole slot 38. There is thus provided structural adjustments of the width of the bed for each of the different adjustments provided by the slots 38.

In the Hollywood bed construction in FIGURE 1, there is provided a suitable hinge 46 for hinging the two bed frames to the headboard. Thus, a U-shaped bracket 49 having slots 50 therein is attached to the headboard 11 and a vertical bracket 51 is attached to the side rail 12. The bracket 51 has apertured lugs or sleeves 52 thereon aligned with apertured ears or lugs 53 on bracket 51 for removably receiving a hinge pin 54.

At the other end of the bed frames, there is provided a retaining means for releasably securing them together. Thus, as shown best in FIGURE 4, there is provided a chain 56 which is fixedly secured to one side rail, while the other side rail is provided with a slot 58 at its extremity in which the chain may be adjustably secured. Thus, the securing means may be released to allow the bed frames to be swung apart for cleaning access between as may be desired.

On each of the four corners of the bed frame there is provided a leg 70 carrying a caster wheel 74. Caster wheel 74 is only illustrative since other types of castering devices and glides may be used. The leg is fixedly mounted upon the outer end of the cross rail sections and is of a novel construction as shown in FIGURES 5–8.

As will be best apparent from these figures, the hinge plate 28 is swingable about the pivot pin 30 and its locking notch 31 is engageable with a locking pin 34 carried by and disposed upon the underside of the horizontal flange 16 of the side rail 12. Also, plate 28 could also be mounted on the top surface of flange 16 if desired. The movement between the folded and the locked position will be apparent from a comparison of FIGURES 7 and 6.

The upper portion of the leg 70 has perpendicularly disposed vertical flanges or walls 76 and 78. The walls 76 as shown in FIGURE 6 rests against the exterior surface of the vertical flange 18 of the side rail and is fixedly secured thereto as by the fastening rivets 80 with the top edge thereof closely underlying plate 28. The other flange or wall 78 is provided with a vertical notch 82 which receives therein and seats therein the vertical flange 18 of the side rail. In addition, the flange 78 is provided with a horizontally disposed laterally inturned flange or finger 84 which underlies the horizontal flange 20 of the cross-rail 14. A fastener 86 extends through the hinge plate 28, the horizontal flange 20 of the cross-rail and the inturned flange or finger 84 to rigidly unite these parts together. The flanges 76 and 78 have a tubular sleeve 72 incorporated on the bottom thereof forming socket 73 for receiving the mounting pin of the castering device 74. It will thus be observed that the angle portion of the upper end of the leg strengthens and rigidifies the cross-rails and side rails at their juncture.

Referring next to the form of the invention shown in FIGURES 9–15, it will be observed that there is provided a foldable leg construction in contrast with the fixedly mounted leg of the preceding embodiment. In this embodiment there is shown a portion of a bed side rail 90 and a cross rail 92. These rails are likewise of angle construction having vertical and horizontal flanges. In this embodiment the side rail is illustrated as having a horizontal flange 94 from which vertically extends upwardly a vertical flange 96. The cross rail on the other hand has a horizontal flange 98 from which depends a vertical flange 100. The cross rail flange 98 underlies the side rail flange 94 and is pivotally connected thereto as by a fastener 102 for horizontal swinging movement between a substantially perpendicular position and a position where it is folded in against the side rail as shown in FIGURES 12, 13 and 14.

In this form of the invention, a modified construction and mounting of the support leg, indicated by the numeral 104 is provided. This leg has the same lower portion as that of the preceding embodiment, its upper portion consisting of the two vertical flanges or side walls 106 and 108 is constructed as follows: A pivot pin 110 extends through aligned registering apertures 112 and 114 in the vertical flanges 100 and 106, with a spacer washer 116 being interposed therebetween. In this manner, the leg is pivoted to the cross rail for swinging movement into a folded position therebeneath as shown in FIGURE 13 to an extended position perpendicular thereto. The vertical wall 108 at its upper end has a laterally outwardly projecting horizontally extending flange or finger 118 which is adapted to overlie the flange 94 and to extend through the notch 120 formed in the adjacent edge of the horizontal flange 94 of the cooperating side rail 90. The edge of flange 98 is cut away at 121 to form a shoulder for abutting the outer surface of the finger 118 to hold it in the notch 120 and engaged with flange 94.

The arrangement is such that it is necessary to swing the cross rail section into longitudinal alignment with the side rail in order to pivot the leg to its perpendicular supporting position, whereupon the cross rail section can be swung perpendicular to the side rail and cause the finger to engage in the notch 120 and overlie and lock against the horizontal flange 94 of the side rail.

Referring now to the embodiment of FIGURES 16–19, it will be noted that a still further modified construction of foldable legs is utilized. In this form, the bed side rail is indicated by the numeral 130 and the cross rail by the numeral 132. The foldable leg assembly 134 is secured to and pivoted to the cross rail 132 and cooperates with the side rail in a manner to be now described.

The upper portion of the leg consists of the perpendicularly disposed vertical flanges or side walls 136 and 138. The wall 136 is pivoted as at 140 to the depending vertical flange 142 of the cross rail 132. The leg flange or side wall 138 is provided at its upper end with a laterally outturned horizontal flange 144 adapted to overlie the horizontal flange 146 of the side rail and to be received in the side rail notch 148 as shown in FIGURE 18. An additional L-shaped bracket 150 is welded or otherwise fixedly secured to the leg wall 138 and has a horizontal flange 152 spaced from but parallel to the flange 144 and adapted to underlie the horizontal flange 146 of the side rail. Thus, in the locked position of the leg, the two flanges 144 and 152 will embrace the top and bottom surfaces respectively of the horizontal flange 146 of the side rail 130 to effectively secure and lock the leg and the cross rail in position. It will be noted that a pivot pin or fastener 154 extends through aligned apertures in the horizontal flanges 146 and 156 of the side and cross rails, with a spacer washer 158 being disposed therebetween. The flange 156 has a cut-out 157 therein which abuts the outer surface of the flange or finger 144 to keep it engaged with the flange 146.

Referring next to the embodiment of FIGURES 20–23 it will be observed that a still further modified construction of the foldable leg assembly is provided. The side rail and cross rail of angle construction are shown at 160 and 162 respectively. The L-shaped upper portion of the leg 164 likewise has a pair of perpendicularly disposed vertical walls or flanges 166 and 168, the former being secured as by a pivot pin or fastener 170 to the vertical flange of the cross rail 162. The other vertical flange 168 is provided with a laterally outturned finger or flange 172 adapted to underlie the horizontal flange of the side rail and having a headed fastener 174 which is receivable in the locking notch 176 of the side rail. The cross rail itself is pivotally secured to the horizontal flange of the side rail as by a pivot pin 180 so that the leg is foldable under the cross rail with the latter in turn being foldable onto the side rail to effect a very compact folding of the frame components. The cross rail 162 includes a notch 173 on the edge to form an abutment to engage the finger 172. The notch 173 receives the wide portion of finger 172 to enable the finger 172 to pivot into engagement with the undersurface of the horizontal flange of side rail 160, thereby orienting the headed pin 174 for movement into the notch 176. The notch 176 is arcuate to receive pin 174 during its arcuate movement about pin 180 with the outer edge of notch 176 serving to cam the pin 174 toward pin 180 to enable the headed pin 174 to pass close to the edges of the horizontal flanges, one edge thereof is flat as at 175.

The washers or spacers 116, 158 also enable the surfaces to be painted easily by any process desired and can be omitted in some instances. Also, FIGURES 16 and 17 illustrate a modified arrangement of adjusting means where the keyhole slots 38' are in the horizontal flange while the apertures 42' and bolt 21 are disposed in the vertical flanges of the cross rail 132.

It will be appreciated that any of the adjusting means and any of the locking means to effect longitudinal adjustment of the cross rails and thus vary the width of the bed may be employed with any of the foldable and locking leg constructions previously described.

The foregoing is considered as illustrative only of the principles of the invention. Further, since numerous modifications and changes will readily occur to those skilled in the art, it is not desired to limit the invention to the exact construction and operations shown and described, and accordingly all suitable modifications and equivalents may be resorted to falling within the scope of the invention as claimed.

What is claimed as new is as follows:

1. An adjustable width bed frame including a pair of side rails and a pair of cross rails, hinge means each connecting an outer end of a cross rail section to a side rail for swinging movement of the former to a folded position against the latter and an extended position substantially perpendicular thereto, a supporting leg secured to and depending from each cross rail section at its outer end, said hinge means comprising a plate fixedly secured to and projecting beyond the outer end of the associated section and being pivoted to the associated side rail, said said and cross rails being angular in cross section having a horizontal flange with a vertical flange depending therefrom, said plate being engaged upon the horizontal flanges of both rails, said supporting leg having angulated side walls, one leg side wall being secured to the exterior surface of a cross rail vertical flange and the other leg side wall being secured to the horizontal flange of said cross rail and to said plate, said leg other side wall having a laterally disposed flange secured in face to face engagement upon the undersurface of said cross rail horizontal flange and further having a slot receiving said cross rail vertical flange at the juncture between the leg side walls.

2. An adjustable width bed frame including a pair of side rails and a pair of cross rails, each cross rail consisting of a pair of longitudinally adjustable sections, hinge means each connecting an outer end of a cross rail section to a side rail for swinging movement of the former to a folded position against the latter and an extended position substantially perpendicular thereto, adjusting means comprising cooperating members carried by and securing the inner ends of said cross rail sections of a pair of sections to each other in longitudinally adjustable overlapping relation, a supporting leg secured to and depending from each cross rail section at its outer end, said hinge means comprising a plate fixedly secured to and projecting beyond the outer end of the associated section and being pivoted to the associated side rail, said side and cross rails being angular in cross section having a horizontal flange with a vertical flange depending therefrom, said plate being engaged upon the horizontal flanges of both rails, said supporting leg having angulated side walls, one leg side wall being secured to the exterior surface of a cross rail vertical flange and the other leg side wall being secured to the horizontal flange of said cross rail and to said plate, said leg other side wall having a laterally disposed flange secured in face to face engagement upon the undersurface of said cross rail horizontal flange and further having a slot receiving said cross rail vertical flange at the juncture between the leg side walls.

References Cited

UNITED STATES PATENTS

| | | | |
|---|---|---|---|
| 1,569,728 | 1/1926 | Douglas | 5—116 |
| 1,653,764 | 12/1927 | Goodwin | 5—116 |
| 1,793,035 | 2/1931 | Whitney | 248—354 |
| 2,544,274 | 3/1951 | Moeller | 5—185 |
| 2,550,426 | 4/1951 | Phillips | 5—8 |
| 2,607,051 | 8/1952 | Jackson | 5—181 X |
| 2,675,567 | 4/1954 | Colson | 5—285 |
| 2,851,702 | 9/1958 | Imber et al. | 5—202 |
| 3,004,265 | 10/1961 | Silverman et al. | 5—176 |
| 3,008,176 | 11/1961 | Paine et al. | 5—8 |
| 3,100,304 | 8/1963 | Brandlin et al. | 5—176 |
| 3,114,917 | 12/1963 | Bogar | 5—176 |
| 3,230,555 | 1/1966 | Hooker | 5—174 X |

FRANCIS K. ZUGEL, *Primary Examiner.*